Jan. 18, 1955
J. R. MOWERY, JR
2,700,115
AIR-COOLED ELECTRIC MOTOR
Filed Oct. 10, 1950
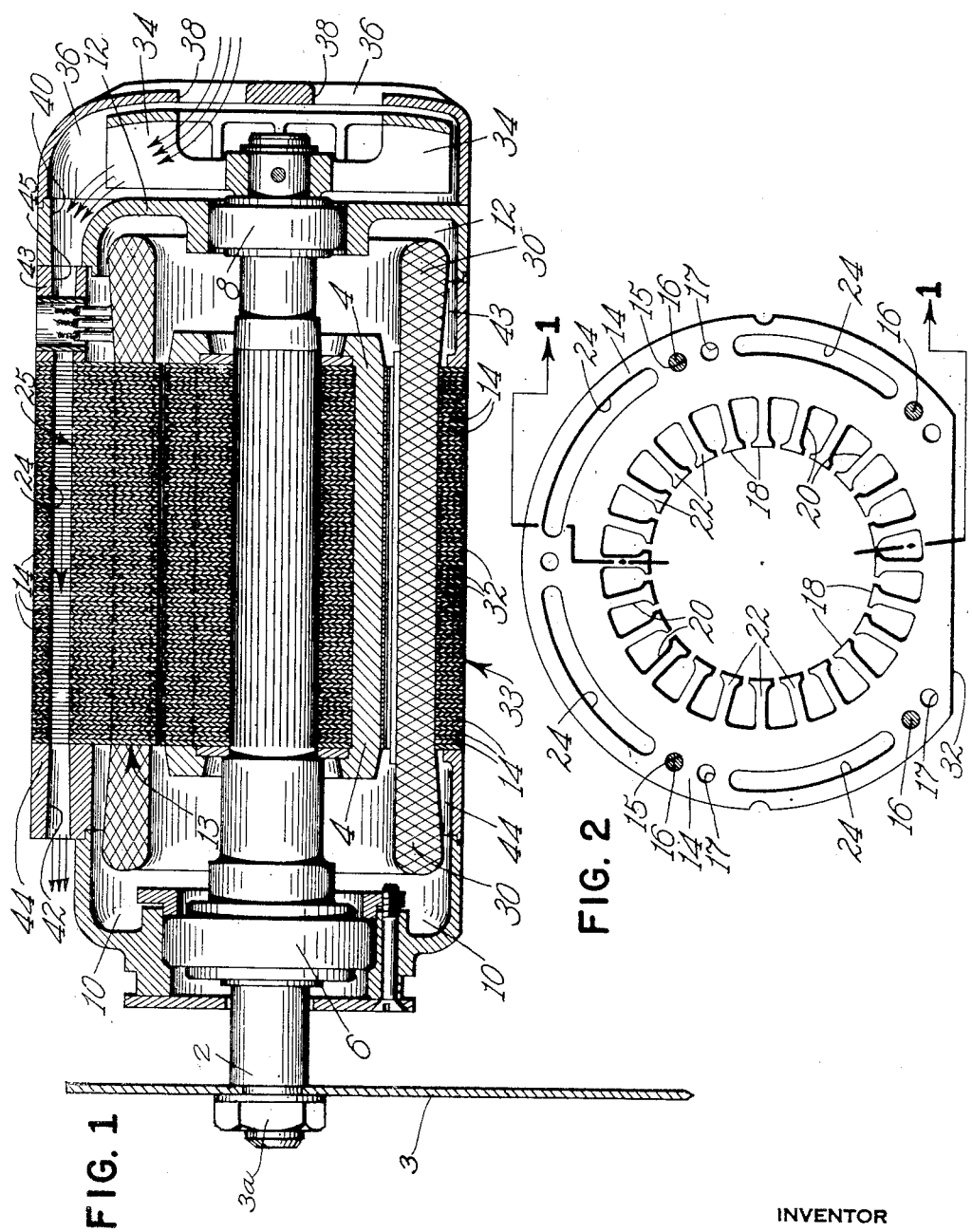
INVENTOR
JESSE R. MOWERY JR.
BY
George S. Hastings
ATTORNEY United States Patent Office 2,700,115
Patented Jan. 18, 1955

2,700,115

AIR-COOLED ELECTRIC MOTOR

Jesse R. Mowery, Jr., Lancaster, Pa., assignor to De Walt Inc., a corporation of Pennsylvania Application October 10, 1950, Serial No. 189,424

1 Claim. (Cl. 310—57)

This invention relates to the construction of totally enclosed fan cooled electric motors and/or dynamos, and more particularly to means for transferring or dissipating the heat generated in these machines.

In machines employing rotary tools, such as saws, abrasive wheels, and the like, it is highly desirable to have a motor of the highest possible horsepower for the smallest possible diameter. The heat generated in an electric motor limits the horsepower that may be developed. A larger motor having more and greater surface area for heat diffusion accordingly may develop greater horsepower than a smaller motor having less surface area. In a powered radial tool of the type described wherein the tool is mounted at the drive or rotor shaft, the smaller the diameter of the motor the greater the free or working radius of the tool.

One of the principal objects of this invention is to permit the construction of an electric motor having a smaller diameter for a given horsepower than would ordinarily be possible. This is accomplished by a more efficient cooling method.

Another object of the invention is to provide on the bottom aspect of the motor a further shortened radius. This is accomplished by locating one of the poles of a single phase winding at the bottom. Flux density under the pole is at a minimum, allowing a section to be cut from the bottom without substantially decreasing the motor's efficiency.

It is a further object of the invention to provide a novel air passage through the stator itself to expose more metal to the circulating air for increased cooling.

In the accompanying drawings:

Fig. 1 is a section taken on a longitudinal plane running through the line 1—1 of Fig. 2; and Fig. 2 is a side elevation of one of the lamina of the stator.

Referring to the drawings, Fig. 2 illustrates one of the plurality of metal lamina 14 that form the stator 13. Each lamina 14 has an internal circular bore 18 of suitable diameter to contain the rotor 4. Slots 20 are cut to form the pole pieces 22. A bottom section is cut from the periphery of each lamina to form a flat 32.

The stator 13 is constructed by stacking a number of these lamina 14 in side by side relationship and securing them by means of rivet rods (not shown) passed through the rivet rod holes 17. The individual structures of each lamina will be in registration with the corresponding structures of the other laminae and so the several slots 24 will form an air passage 25; the pole pieces 22 will form a pole ridge to support the stator winding 30; and the flats 32 will provide a flat bottom 33. Thus the radius of the bottom segment will be shorter than any other radius of the motor.

It is preferable to use a single phase motor so wound that one pole thereof is positioned at the center of the flat bottom 33. Hence, the flux density in this area is at a minimum so that the removal of metal (to form the flat bottom 33) does not result in a substantial loss of flux.

End rings 43, 44 and end bells 10 and 12 are secured on the stator by means of tie rods 16 which pass through suitable holes 15 in the end bells, end rings and lamina of the stator.

The rotor 4 secured on the drive shaft 2 is revolubly mounted in the stator by means of ball bearings 6 and 8 located in the front and rear end bells 10 and 12 respectively. To the front end of the drive shaft 2 is mounted the rotary saw or abrasive wheel 3 by suitable means such as the nut 3a threaded on the end of the shaft. On the rear end of the drive shaft there is mounted an airscrew or fan 34. A fan guard 36 suitably secured to the rear end bell 12 encloses fan 34. The fan guard has several ports 38 to admit air. In operation, fan 34 drives air admitted by ports 38 through the communicating ports 40 and 45 of end bell 12 and end ring 43 respectively. Ports 43 communicate with stator passages 25. The air then leaves the motor through end ring 44 by virtue of communicating ports 42 in end ring 44.

It will be readily noted that this circulatnig air passes through the metal of the stator itself. Considering the lamina shown in Fig. 2, it may be seen that the heat generated centrally of the arcuate slots 24 will be dissipated inductively through the metal around both sides of the slots 24. This greatly increases the cooling efficiency since the entire wall of the passages 25 dissipate heat to the air flow.

At the same time, a certain amount of the field flux passes around the ends of slots 24 utilizing the metal located distally of these slots.

Having described my invention what I claim is:

In an electric motor, the combination with a combined stator and casing to eliminate the necessity of a separate casing to facilitate cooling, said combination stator and casing comprising a plurality of unitary substantially circular laminae having several circumferentially elongated completely enclosed arcuate slots positioned near the periphery thereof of such length to constitute a major portion of a circumferentially curved plane passing through said slots and rivet rod holes and tie rod holes positioned between said slots and in substantially the same circumferentially curved plane, said laminae being flattened on the bottom edge and assembled to form said combination stator and casing and having rivet pins in said rivet holes so the slots of each lamina register with the slots of each other lamina to form air passageways having the same metal on all sides so that heat generated centrally of said arcuate slots will contact air in said slots and the circumference of said stator may be materially reduced as a result of said cooling means and said position of said rivet pins and said rivet pin holes and said assembled stator and casing being supportable on the flat bottom formed by the flattened bottom edges of said lamina, end casings fastened at the ends of the assembled stator, tie rods securing said end casings to said stator, one of said end casings being formed with the periphery co-extensive to the periphery of said stator and having a channel formed therein faired to said air passageways in said stator, the other of said end bells being formed of lesser diameter than said stator to permit free exhaust air from said air passageways, and means in said first end bell to create air flow through said faired channel and said slot formed passageways.

References Cited in the file of this patent

UNITED STATES PATENTS

| Number | Name | Date |
|---|---|---|
| 931,620 | Kelley | Aug. 17, 1909 |
| 973,565 | Reist | Oct. 25, 1910 |
| 1,043,887 | Wiard | Nov. 12, 1912 |
| 1,286,013 | Jeannin | Nov. 26, 1918 |
| 1,449,577 | Bergstrom | Mar. 27, 1923 |
| 1,723,912 | Bergman | Aug. 6, 1929 |
| 1,843,315 | Blish | Feb. 2, 1932 |
| 1,882,487 | Dupont | Oct. 11, 1932 |
| 1,892,997 | Oldenburg | Jan. 3, 1933 |
| 1,990,035 | Kratz | Feb. 5, 1935 |
| 2,176,871 | Harrell | Oct. 24, 1939 |
| 2,222,764 | Gaston | Nov. 26, 1940 |
| 2,414,532 | Johns | Jan. 21, 1947 |
| 2,508,207 | Woll | May 16, 1950 |
| 2,517,882 | Johnson | Aug. 8, 1950 |

FOREIGN PATENTS

| 384,288 | Great Britain | Feb. 24, 1931 |
| 713,820 | Germany | Nov. 15, 1941 |